United States Patent [19]
Wilkinson

[11] Patent Number: 4,480,270
[45] Date of Patent: Oct. 30, 1984

[54] AUDIO/VIDEO SIGNAL RECORDING METHOD

[75] Inventor: Richard L. Wilkinson, El Toro, Calif.

[73] Assignee: Discovision Associates, Costa Mesa, Calif.

[21] Appl. No.: 316,015

[22] Filed: Oct. 28, 1981

[51] Int. Cl.³ .............................................. H04N 9/491
[52] U.S. Cl. .................................. 358/310; 358/330; 358/343
[58] Field of Search ................ 358/310, 330, 342, 343

[56] References Cited

U.S. PATENT DOCUMENTS 3,893,163 7/1975 Wessels et al. ..................... 358/330
3,972,064 7/1976 Keizer ................................. 358/343
3,978,279 8/1976 Boruschewitz et al. ............ 358/310

Primary Examiner—Richard Murray
Attorney, Agent, or Firm—Ronald J. Clark

[57] ABSTRACT

A method for recording video and audio information onto a recording medium which involves recording a carrier frequency signal, frequency modulated with composite color video information, and a subcarrier frequency signal, modulated with audio frequency information onto the recording medium and selecting the frequencies of the carrier and subcarrier signals such that the subcarrier frequency is lower than the second lower chroma sideband of the modulated carrier signal.

6 Claims, 9 Drawing Figures

AUDIO/VIDEO SIGNAL RECORDING METHOD

BACKGROUND OF THE INVENTION

1. Field of the Invention

The present invention relates to a method for recording audio and video signals onto a recording medium, and more particularly relates to a method for modulating carrier frequencies with video and audio information and for selecting the carrier frequencies such that the resultant frequency components are arranged throughout the frequency spectrum so as to optimize the information storage capability of the recording medium.

2. Brief Description of the Prior Art

The present invention is adapted particularly for use in connection with a recording medium in which recorded signal amplitude variations are not used to carry information. An example of such a recording medium is the optical disc. An optical disc is a clear plastic disc approximately the size of an LP phonograph record, which has an information carrying surface embedded in its interior. This information carrying surface has a relatively uniform optical property which may be altered at specific locations so as to impart information to the surface which can then be "read" by way of a beam of light imaged onto the surface. For example, a uniformly reflective surface may be provided and small indicia, such as small pits, having altered reflective properties may be arranged sequentially in circular or spiralling tracks. The disc is read by imaging a beam of light onto a track and causing the disc to rotate so that the spot of light scans along the track. The light which is reflected off of the surface is detected by a photodetector which produces an electrical signal in response to the light. Variations in the intensity of the reflected light due to the alternate presence or absence of the indicia cause variations in the electrical signal. These variations in the electrical signal represent the information stored in the disc.

Information is stored in the disc in the form of variations in the spatial frequency of the indicia in the track, and also in "duty cycle" variations, that is, variations in the relative length of the indicia as compared with the "land" of reflective surface between them. When read by a beam of light and photodetector, as described above, the spatial frequency and duty cycle variations of the indicia cause time frequency variations and time duty cycle variations of the detected electrical signal.

U.S. Pat. No. 3,893,163 ("the 163 patent") which was issued July 1, 1975, discloses a method of recording a video signal onto a recording medium, such as a disc, according to which the luminance and chrominance signals are separated from one another prior to recording. The luminance information is then used to frequency modulate a carrier while the chrominance information is used to frequency modulate a subcarrier. The frequency modulated carrier and subcarrier are summed, resulting in "duty cycle" modulation of the carrier by the subcarrier at the zero crossing points of the carrier. That is, the length of the positive half of the signal cycle is modulated with respect to the length of the negative half of the cycle. The zero crossings of the composite signal are detected and used to generate a square wave of constant amplitude. This square wave signal may be used to generate the indicia on an optical disc such that the luminance information is contained in the spatial frequency variation of the recorded indicia, and the chrominance information is contained in the duty cycle variation of the recorded indicia. Also disclosed in that patent is the technique of summing a frequency modulated sound subcarrier with the modulated chrominance subcarrier and luminance carrier prior to detecting the zero crossings of the composite signal to generate the aforementioned square wave signal.

While the method described in the '163 patent has the advantage of providing a technique for recording color video information and audio information onto an amplitude insensitive recording medium such as an optical disc, it has the disadvantage of requiring that the chrominance information be separated out from the luminance information and modulated onto a separate subcarrier. This requires the use of complex and costly additional circuitry in both the recorder and player electronics when processing standard NTSC color video signals for use in standard consumer television sets.

Another technique, described in an article entitled "System Coding Parameters, Mechanics and Electro-Mechanics of the Reflective Video Disc Player," by P. W. Bogels and N. V. Philips, presented at the IEEE 17th Chicago Spring Conference on Consumer Electronics, June 8, 1976, has been used successfully in commercial applications. This technique ("the Bogels technique") involves frequency modulating a carrier signal with a standard NTSC color video signal, and then modulating the zero crossings of the resultant FM signal with a frequency modulated audio subcarrier in a manner similar to the duty cycle modulation disclosed in the '163 patent.

One problem encountered in recording information on an optical disc, using any method, is fitting the information on the discs within the bandwidth limit of the disc. Optical discs made commercially for video recording and playback have an upper cutoff frequency of about 13 MHz. Fitting luminance, chrominance and audio signals onto such a bandwidth limited medium requires care to ensure that side bands and intermodulation products do not interfere with signal recovery.

A successful format for optical discs which has been applied to the Bogels modulation technique described above involves the provision of a carrier signal at a frequency of approximately 8 MHz, frequency modulated with composite video signals such that the carrier frequency corresponds to blanking level, sync tips correspond to approximately 7.6 MHz, and full white corresponds to approximately 9.3 MHz. Two separate frequency modulated audio subcarriers are positioned in the spectrum at approximately 2.3 MHz and 2.8 MHz. This format is described in some detail in the Bogels article.

For a number of years this format has been considered to be the optimum arrangement for recording audio and video information on commercial optical video discs. However, while the format yields high quality optical video disc recordings, it has been known that when using this format the recording and playback parameters of both the electrical and mechanical systems must be maintained within very close tolerances to avoid the introduction of excessively large second order harmonic intermodulation products. In particular, the second order intermodulation products resulting from the presence of the audio subcarriers have proved most troublesome in this regard.

It will therefore, be appreciated that there is a need for an improved method of recording audio and video information onto a recording medium which avoids the above mentioned problems. More particularly, there is a need for a method of recording video and audio information onto a recording medium having a limited bandwidth such that the interfering effect of intermodulation products are minimized. In addition, there is a need for such a method which provides improved suppression of second order intermodulation products from an audio subcarrier and video carrier.

The present invention fulfills these needs.

SUMMARY OF THE INVENTION

The present invention resides in a method for recording video and audio information onto a recording medium that may be insensitive to the variations in the amplitude of the recorded information. The method is particularly useful in recording color video information and audio information onto optical discs.

In its broader aspects, the method comprises modulating a carrier signal with a color video signal, modulating a subcarrier frequency with an audio frequency signal, selecting the carrier and subcarrier frequencies such that the upper frequency deviation limit of the frequency modulated carrier signal is lower than the useful frequency upper limit of the recording medium, and the subcarrier frequency is less than the lower second chrominance sideband of the modulated carrier. The frequency modulated subcarrier and carrier signals are added and the zero crossings of the resultant signal are detected. The detected zero crossings are then recorded on the recording medium.

In its narrower aspects, carrier frequency and deviation ratio are selected such that the necessary information for high quality video recording and playback lie within the confines of the useful frequency limit of the optical disc, while at the same time a region in the spectrum below the lower second order color frequency sideband is created having sufficient frequency bandwidth so as to enable the insertion of a frequency modulated audio subcarrier in the region of approximately 0.5 to 1.0 MHz.

An important benefit which results from the application of the present invention to video and audio recording is that the second order video carrier and audio subcarrier intermodulation products having the greatest amplitude are placed relatively close to the carrier frequency as compared with prior art approaches, and the overall impact of these intermodulation products on the quality of the recovered video picture is minimized.

Other aspects and advantages of the present invention will become apparent from the following description of the preferred embodiment, taken in conjunction with the accompanying drawings, which disclose, by way of example, the principles of the invention.

DETAILED DESCRIPTION OF THE PREFERRED EMBODIMENT

Figure 1:
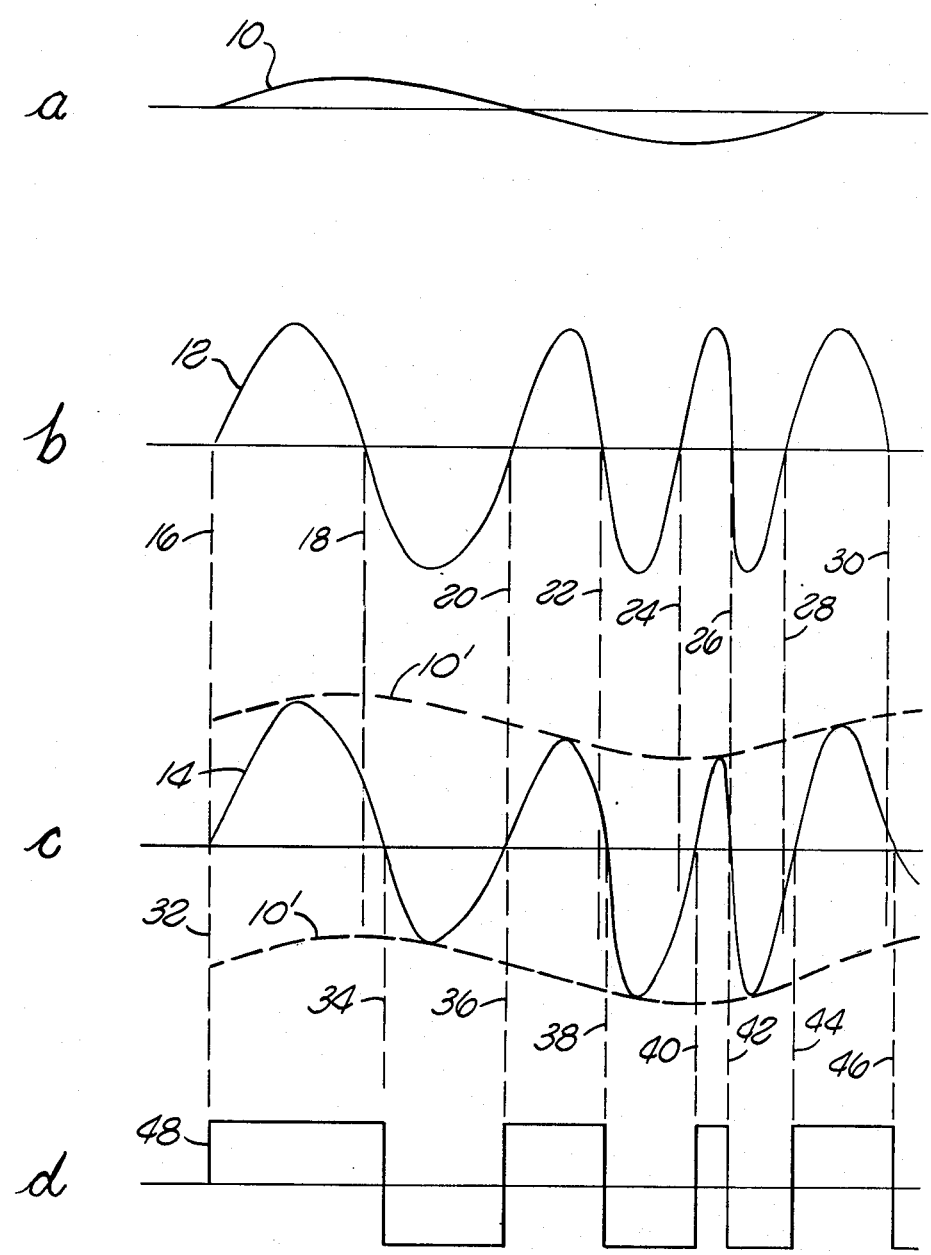
FIG. 1 shows signal wave forms generated in the practice of the preferred embodiment of the present invention.

FIG. 1 shows several waveforms which illustrate the modulation technique used in connection with the preferred embodiment of the present invention. FIG. 1A shows an approximately sinusoidal waveform 10 of a subcarrier signal frequency modulated with audio frequency information. FIG. 1B shows a carrier signal frequency waveform 12 modulated with color video information. FIG. 1C shows a composite signal 14 resulting from the addition of the signals shown in FIGS. 1A and 1B. The waveform 10' of the subcarrier signal is shown in dashed lines as an envelope of the composite signal to better illustrate the result of the addition of the two signals.

The relative time relationship between the zero crossings of the frequency modulated carrier signal shown in 1B, and the zero crossings of the composite signal shown in 1C, can be seen by comparing dashed lines 16-30 with dashed lines 32-46. It will be appreciated that information resides both in the frequency variation of the composite signal 14 as well as in the deviated zero crossings of the composite signal 14.

FIG. 1D shows a square wave constructed from the zero crossing information of the composite signal 14. The square wave signal 48 contains the same information as the composite signal 14 in frequency and zero crossing variations and can be used to record the information on a medium in which amplitude variations do not play a role.

Figure 2A:
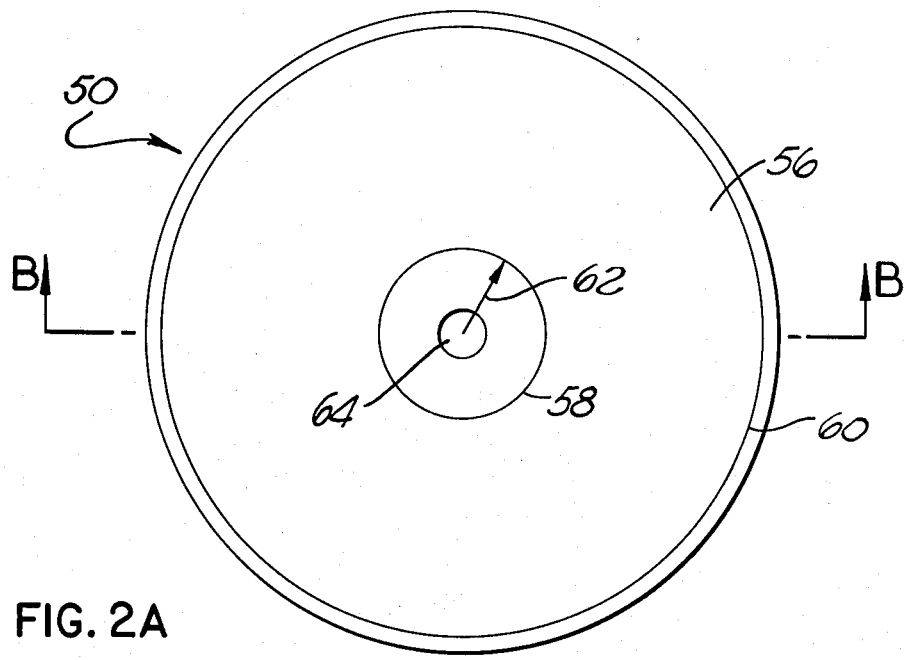
FIG. 2 is a plan view of an optical disc.
Figure 2B:
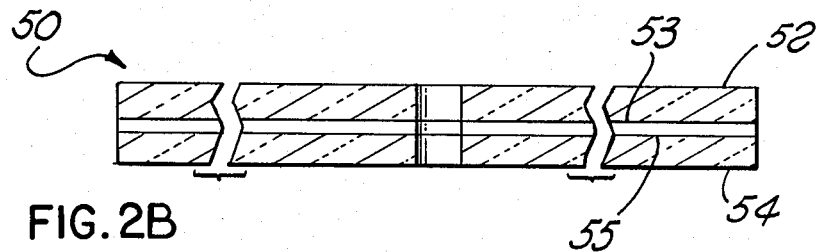

FIG. 2A is a plan view depicting an optical disc 50 used in connection with the practice of the preferred embodiment of the present invention. FIG. 2B is a cross section view of optical disc 50 through line B—B of FIG. 2. The disc 50 is made of two pieces 52, 54, of optically clear plastic which are bonded together, for example with adhesive glue. The interior, facing surfaces 53, 55 of the two pieces 52, 54, respectively, are reflective and comprise the information carrying surfaces of the disc. These surfaces are typically provided with a coating of metal to enhance their reflectance. Having two reflective, information carrying surfaces, the disc is "two sided".

Information is recorded in the disc 50 in the form of one or more tracks of indicia, such as pits or holes, in each of the reflective surfaces provided in the interior of the disc 53, 55. One typical configuration of track is a continuous spiral track of elongated pits or bumps approximately 1 micron long which are formed in a reflective surface. This track occupies only a portion 56 of the reflective surface, bounded by concentric circles 58 and 60, as shown. The inner radius, "r", of the track is depicted by arrow 62 in FIG. 2A. The disc 50 is also provided with a central aperture 64 for centering the discs 50 on a spindle for rotation.

Figure 3:
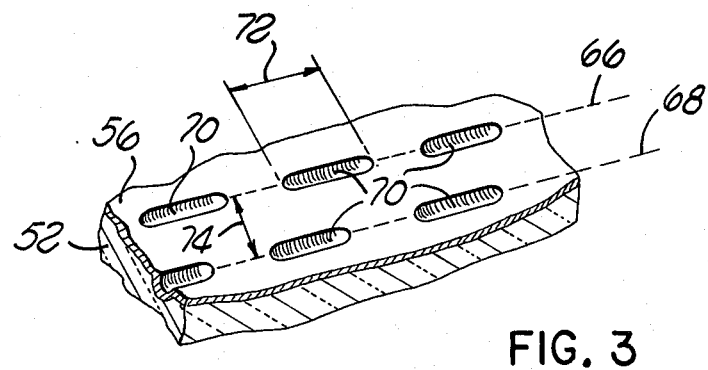
FIG. 3 is an orthogonal view of a small section of the optical disc shown in FIG. 2, greatly magnified.

FIG. 3 depicts a section of one of the pieces 52 of the disc 50, greatly magnified, showing two adjacent tracks 66, 68, of information indicia 70. The indicia 70 are formed as elongated pits in the reflective surface 56, spaced sequentially in the form of a continuous track. As can be seen, the coating of metal 65 follows the contour of the reflective surface 56. The length of the pits 70, as depicted by arrow 72, varies in accordance with the information content, but is of the order of magnitude of approximately one micron. The spacing between pits in a track also varies in accordance with the information content and is approximately one micron. Track to track spacing, or pitch, as depicted by arrow 74, is nominally 1.67 microns.

The indicia, such as the pits 70 shown on FIG. 3, can be formed in the reflective surface 56 in accordance with any one of a number of known processes. In all such cases information is recorded by varying the length and frequency of occurrence of the indicia in accordance with an information signal such as square wave 48 (FIG. 1) discussed above. For example, the positive-going half cycles of square wave 48 may correspond to the indicia and the negative-going half cycles to the "lands" of reflective surface there between, or vice versa.

The information recorded on the disc 50 is retrieved by imaging a beam of laser light to an extremely small spot on a track, rotating the disc at an appropriate rate thus causing the spot of laser light to "read" the track, and then detecting the reflected light as described above.

Figure 4:
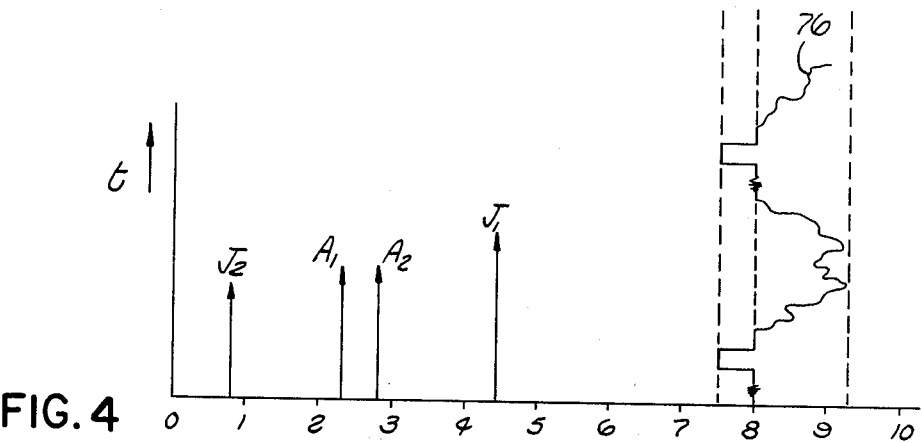
FIG. 4 shows a spectrum illustrating a format of video and audio information modulated and arranged according to a prior art technique.

FIG. 4 is a graph showing a frequency format described in the aforementioned article by Bögels, et al. for an optical disc having an upper frequency limit of about 13 MHz. The horizontal axis corresponds to frequency, while the vertical axis corresponds to time. The carrier frequency at 8.0 MHz is frequency modulated with a video signal such that synch tips corresponds to 7.6 MHz, blanking corresponds to the carrier (8.0 MHz) and full white corresponds to 9.3 MHz, as depicted by time-line 76. The audio subcarriers, $A_1$ and $A_2$, are shown on the graph as vectors. It will be understood that the audio subcarriers have bandwidths approximately 100 KHz wide. The two lower chroma sidebands, $J_1$ and $J_2$, are also shown, as vectors, to show their relation to the audio subcarriers $A_1$ and $A_2$.

Briefly summarizing the considerations set forth in the aforementioned article by Bögels, et al., that were involved in the selection of the aforementioned frequencies, the video carrier frequency was selected such that the first order chroma side band appears "to the right" of (higher in frequency than) the intermodulation component equal in frequency to the difference between the video carrier frequency and the frequency of the lower first order chroma side band, while the upper first order chroma side band is maintained within the useful frequency bandwidth of the disc. The audio carriers $A_1$ and $A_2$ were located in the "hole" in the spectrum between the side band components $J_1$ and $J_2$. It was considered that this frequency selection yields minimum unwanted visible disturbance of the video picture as a result of the appearance in the spectrum of unwanted intermodulation products.

The above format described in connection with FIG. 4 permits the recording of audio and color information onto a 13 MHz bandwidth limited video disc with acceptable performance characteristics for relatively high quality video viewing and audio playback fidelity. However, it has been observed that in the recording process a high degree of care must be exercised to ensure that the "duty cycle" is kept within close tolerances. If these stringent duty cycle tolerance limits are exceeded, unwanted intermodulation products caused by the resultant "asymmetry" give rise to unwanted visual disturbances in the recovered video picture. Maintaining such close tolerances is costly. Nonetheless, in spite of the strict quality requirement imposed by this phenomenon, it has been widely considered to be a necessary burden incident to the optimal frequency format for the above described optical disc.

Figure 5:
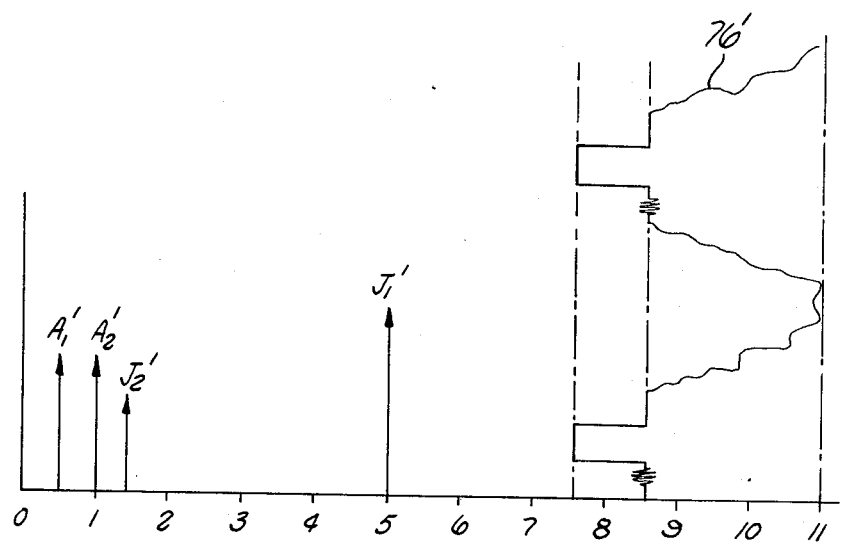
FIG. 5 shows a spectrum illustrating a format of video and audio information, modulated and arranged in accordance with the principles of the present invention.

FIG. 5 shows a frequency spectrum illustrating a format for recording video and audio information onto a recording medium according to the preferred embodiment of the present invention. A color video signal, including luminance and chrominance signal information, frequency modulates a carrier signal having a frequency of 8.6 MHz. Frequency deviation limits are illustrated by the time line 76' shown on the graph. Thus, sync tip corresponds to 7.6 MHz, blanking corresponds to 8.6 MHz, while full white corresponds to 11 MHz. Audio subcarriers $A_1'$ and $A_2'$ are provided at 0.5 and 1.0 MHz, respectively. The first and second lower chroma sidebands $J_1'$ and $J_2'$ are shown to illustrate their relation to the audio subcarriers $A_1'$ and $A_2'$. As can be seen, the audio subcarriers $A_1'$ and $A_2'$ appear to the left of the second lower chroma sideband, that is, they are lower in frequency than the $J_2'$ sideband.

Figure 6:
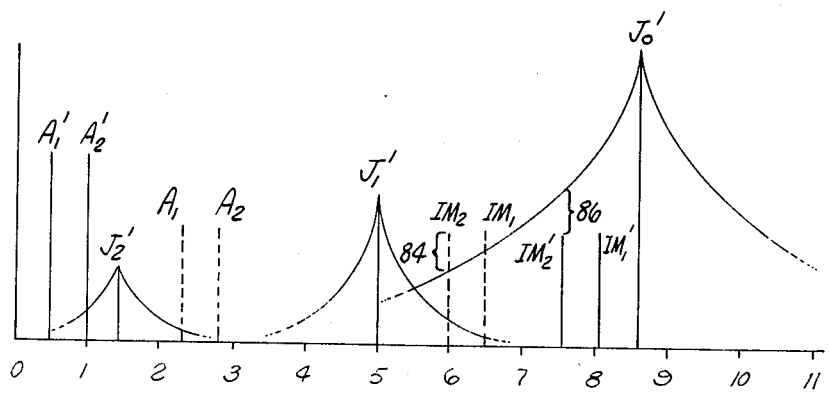
FIG. 6 shows a frequency spectrum illustrating the major frequency components, including intermodulation products, which result from the application of the format depicted in FIG. 5.

FIG. 6 is a frequency spectrum showing the major frequency components resulting from the frequency modulation format depicted in FIG. 5. Whereas in FIG. 5 the vertical axis represents time for the purposes of illustration, in FIG. 6 the vertical axis represents amplitude. Thus it will be appreciated that the graph of FIG. 6 represents the actual frequency components which are generated as a result of providing modulated signals in accordance with the format depicted in FIG. 5.

Shown in FIG. 6 are the video carrier itself, $J_0'$, the first and second lower chroma sidebands, $J_1'$ and $J_2'$, respectively, and the two audio subcarriers $A_1'$ and $A_2'$. Also shown are the most significant second order intermodulation products $IM_1'$ and $IM_2'$ resulting from the intermodulation between the audio subcarriers $A_1'$ and $A_2'$ and the video carrier $J_0'$. These intermodulation products $IM_1'$ and $IM_2'$ appear at frequencies equal to the difference between the audio subcarrier frequencies and the video carrier frequency. Thus, designating the frequency of the carrier, $J_0'$ as $f_d$, the frequency of the audio subcarrier $A_1'$ as $f_{A1}$ and the frequency of the audio subcarrier $A_2'$ as $f_{A2}$, then the intermodulation products $IM_1'$ and $IM_2'$ appear at frequencies equal to $f_c - F_{A1}$ and $f_c - f_{A2}$, respectively.

For purposes of comparison, dashed lines are shown at 2.3 MHz and 2.8 MHz, representing the frequency location of audio subcarriers $A_1$ and $A_2$, respectively, selected according to prior art principles. The intermodulation products $IM_1$ and $IM_2$ resulting from audio subcarriers $A_1$ and $A_2$ are also shown in dashed lines.

Figure 7:
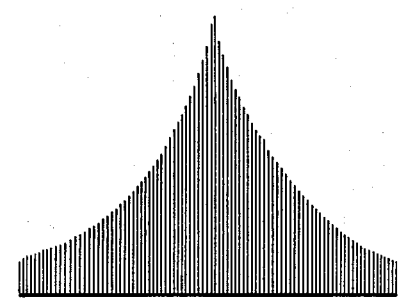
FIG. 7 shows a portion of the frequency spectrum of FIG. 6 illustrating the luminance information sidebands.

To better appreciate the principles of the present invention, envelopes 78, 80 and 82 are shown associated with frequency components $J_0'$, $J_1'$ and $J_2'$, respectively. These envelopes depict the full modulation side bands which appear around each of these frequency components at frequency intervals equal to the horizontal sync frequency. FIG. 7 illustrates the appearance of these subcarriers in more detail. From FIG. 7, it will be appreciated that the envelopes 78, 80 and 82 in FIG. 6 follow the configuration defined by the peak amplitudes of the numerous side band components appearing around frequency components $J_0'$, $J_1'$ and $J_2'$.

Using these envelopes as a reference, intermodulation products $IM_2$ and $IM_2'$ can be compared. As can be seen in FIG. 6, the signal level of component $IM_2$ exceeds the side band envelope level at that frequency by an amount 84, while the level of the intermodulation component $IM_2'$ is less than the side band envelope level by an amount 86. The significance of this lies in the fact that the envelope of side band frequency components can be regarded as a kind of graph of the relative magnitude of visual effect produced in a recovered video signal for a side band frequency component at a particular frequency. It will be appreciated from the shape of the envelopes that the farther away in frequency the frequencies of audio subcarriers $A_1'$ and $A_2'$ are spaced from $J_0'$, the less the amount of intermodulation distortion effects. It is highly desirable, however, to do this without sacrificing playing time afforded by the disc. As described in more detail in the aforementioned article by Bögels, et al., for an optical video disc of standard size designed to rotate at a frequency of 30 Hz (NTSC) and be used with an optimized objective lens (having a Numerical Aperture of 0.4), the optimum track pitch was determined to be 1.66 microns. Given the aforementioned optimized parameters, the minimum useable inner track radius, "r" (FIG. 2) is 55 millimeters which gives a maximum playing time of 30 minutes per side and an upper cutoff frequency of approximately 13 MHz. It has long been considered that this upper frequency limit represents an optimum value which could not be increased without degrading one or more of the performance parameters carefully balanced in arriving at the above frequency limit.

Figure 8:
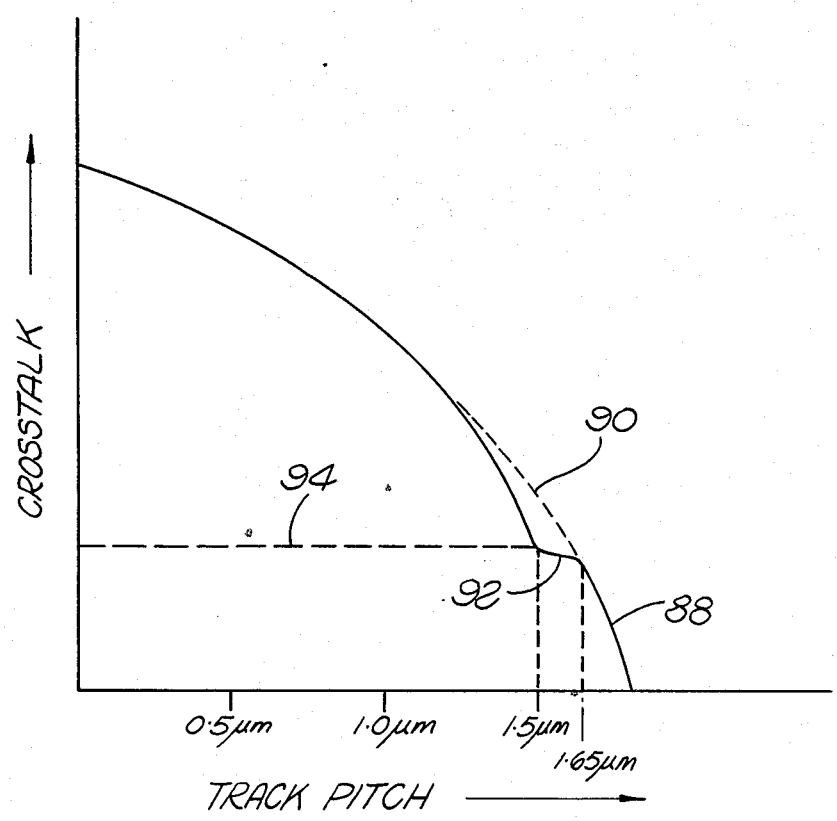
FIG. 8 is a graph showing the relationship between track pitch and amount of crosstalk between tracks of an optical disc.

However, it has now been discovered that this frequency limit can be extended sufficiently to allow an increase in the carrier frequency $J_0'$ (FIG. 6) and to permit the application of the principles of the present invention regarding placement of the audio subcarriers so as to minimize the interference in the recovered video due to the resultant intermodulation products, as described above. This discovery is best described in connection with reference to FIG. 8. FIG. 8 is a graph showing the relationship between track pitch and crosstalk for an optical disc. The "S" shaped curve 88 is a plot of measured values of crosstalk versus track pitch. The dashed curve 90 depicts a continuation of curve 88 which might be expected, representing a relationship whereby a diminution in track pitch causes a steadily increasing crosstalk.

It has been found, however, that the actual curve representing the relationship between crosstalk and track pitch exhibits a plateau-like region 92 such that the observed crosstalk at a track pitch of 1.5 micrometers is close in value to the amount of crosstalk measured at a track pitch of 1.65 micrometers, as shown by reference to dashed line 94. It should be noted that the plateau-like region 92 is exagerated in extent in the view for purposes of illustration. The actual effect is a somewhat more gradual curve in the region 92. This discovered relationship permits the construction of a standard sized optical video disc having an inner, limiting track radius of 65 millimeters, as contrasted with the prior art 55 millimeters. An inner track radius of 65 millimeters, together with a track pitch of 1.50 micrometers permits the placement of 30 minutes of program material on a single side of a disc, other parameters remaining constant. By extending the limiting inner radius from 55 millimeters to 65 millimeters, the number of indicia that can be "packed" into the track is increased so as to extend the bandwidth of the disc from approximately 13 MHz to approximately 15.5 MHz. This permits the application of the format of the preferred embodiment of the present invention, discussed above in connection with FIG. 5. Further, the increase in the upper useful frequency limit of the disc permits the further advantage of increasing the deviation of the FM carrier $J_0'$ from 1.8 MHz to 3.4 MHz. This has a further beneficial effect of reducing the relative effect of unwanted frequency components such as intermodulation products, and provides an approximately 6 db increase in the demodulated video signal S/N ratio as compared with the prior art format shown in FIG. 4.

From FIG. 5, it can be observed that the first lower chrominance sideband, $J_1'$, is positioned at about 5 MHz. Given the frequency of the composite video signal carrier, $J_0'$, of 8.6 MHz, supra, it can be appreciated that the improved signal-to-noise ratio and lower intermodulation distortion figures relating audio subcarriers $A_1'$ and $A_2'$ with $J_2'$ are realizable using standard NTSC specifications of 3.6 MHz (8.6 MHz − 5.0 MHz) for the nominal color signal frequency, $f_c$.

It will therefore be appreciated that the frequency format shown in FIG. 5 represents a highly improved format for the recording of audio and video information on standard commercial video optical discs as compared with prior art formats.

Although the invention has been described in detail with reference to its presently preferred embodiment, it will be understood by one of ordinary skill in the art that various modifications can be made, without departing from the spirit and scope of the invention. Accordingly, it is not intended that the invention be limited, except as by the appended claims.

I claim:

1. A method for recording audio and video information onto a recording medium having a predetermined useful frequency upper limit, $f_u$, comprising the steps of:

providing a composite video signal comprising a luminance video signal having a bandwidth $f_L$, and a color video signal having a predetermined nominal frequency, $f_c$=3.6 MHz, added to said luminance video signal;

providing an audio frequency signal having a bandwidth $f_d$;

providing a video carrier signal having a frequency $f_b$;

providing an audio subcarrier signal having a frequency $f_a$;

frequency modulating said video carrier signal with said composite video signal;

frequency modulating said audio subcarrier signal with said audio frequency signal;

selecting said video carrier signal frequency, $f_b$, and said audio subcarrier signal, $f_a$, such that $f_b - 2f_c$ is greater than $f_a$ while the frequency $f_b + f_L$ is no greater than $f_u$;

shifting the zero crossings of the ascending and the descending edges of said modulated carrier signal in mutually opposite dependence upon said modulated audio subcarrier, and recording the shifted zero crossing of said modulated carrier signal on the recording medium;

providing a second audio frequency signal having a bandwidth $f_e$;

providing a second audio subcarrier signal having a frequency $f_g$;

frequency modulating said second audio subcarrier signal with said second audio frequency signal;

selecting said second audio subcarrier frequency $f_g$ such that $f_b - 2f_c$ is greater than $f_g$, and such that $f_a - f_g > f_d + f_e$; and adding said modulated first audio subcarrier and said modulated second audio subcarrier before performing said step of shifting the zero crossings.

2. A method for recording audio and video information onto a recording medium having a predetermined useful frequency upper limit, $f_u$, comprising the steps of:

providing a video carrier signal having a carrier frequency $f_b$, frequency modulated with a composite video signal comprising a luminance video signal and a color video signal having a predetermined nominal frequency, $f_c = 3.6$ MHZ, added to the luminance video signal, wherein the maximum deviation frequency of said frequency modulated video carrier signal is $f_w$;

providing an audio subcarrier signal having a frequency $f_a$, frequency modulated with an audio frequency signal, wherein the maximum frequency deviation of said frequency modulated audio subcarrier signal is $f_d$;

selecting said video carrier signal frequency, $f_b$, and said audio subcarrier signal, $f_a$, such that $f_b - 2f_c$ is greater than $f_a$, while the sum of the frequencies $f_b + f_W$ is no greater than $f_u$;

shifting the zero crossings of the ascending and descending edges of said modulated carrier signal in mutually opposite dependence upon said modulated audio signal, and recording the shifted zero crossings of said modulated carrier signal on the recording medium;

providing a second audio subcarrier signal having a frequency $f_g$, frequency modulated with a second audio frequency signal, wherein the maximum frequency deviation of said modulated second audio subcarrier signal is $f_e$;

selecting said second audio subcarrier frequency $f_g$ such that $f_b - 2f_c$ is greater than $f_g$, and such that $f_a - f_g > f_d + f_e$; and adding said modulated first audio subcarrier signal and said modulated second audio subcarrier before performing said step of shifting the zero crossings.

3. A method for recording audio and video information onto a recording medium having a predetermined useful frequency upper limit, $f_u$, comprising the steps of:

providing a composite video signal comprising luminance information of bandwidth $f_L$, and color information of predetermined nominal frequency, $f_c = 3.6$ MHz;

providing an audio frequency signal having a bandwidth $f_d$;

providing a composite video carrier signal having a frequency $f_b$, said composite video carrier signal frequency being sufficiently high so as to leave a region in the frequency spectrum below 1 MHz substantially free of any contributions by second order lower chrominance sidebands spaced below said composite video carrier frequency, $f_b$, by a frequency $2f_c$;

providing an audio subcarrier signal having a frequency $f_a$;

frequency modulating said composite video carrier signal with said composite video signal;

frequency modulating said audio subcarrier signal with said audio frequency signal;

selecting said composite video carrier signal frequency, $f_b$, and said audio subcarrier signal, $f_a$, to satisfy the relationship $f_b - 2f_c$ is greater than $f_a$, while the frequency $f_b + f_L$ is less than $f_u$;

shifting the zero crossings of the ascending and descending edges of said modulated composite video carrier signal in mutually opposite dependence upon said modulated audio subcarrier, and recording the shifted zero crossing of said modulated composite video carrier signal on the recording medium.

4. The method as claimed in claim 3, wherein said step of providing an audio subcarrier signal includes selecting the audio subcarrier signal frequency to be less than the frequency of the lower frequency limit of the full modulation sideband of the second order lower chrominance sideband.

5. The method as claimed in claim 3, wherein said step of frequency modulating said composite video carrier signal includes modulating said carrier composite video signal to have a frequency deviation of about 3.4 MHz.

6. A disc-shaped record medium having its recorded information content in the form of alternate regions of different reflectivity along a substantially circular path, said disc comprising:

a plurality of said substantially circular tracks of information arranged with a track pitch of about 1.5 microns, the inner most track of said plurality of tracks having a minimum radius of about 65 millimeters, thereby to produce a signal bandwidth for the recorded information to extend to approximately 15.5 MHz.

* * * * *